(12) United States Patent
Coronado et al.

(10) Patent No.: US 7,803,737 B2
(45) Date of Patent: Sep. 28, 2010

(54) SOLID MATERIALS FOR REMOVING ARSENIC AND METHOD THEREOF

(75) Inventors: Paul R. Coronado, Livermore, CA (US); Sabre J. Coleman, Oakland, CA (US); Robert D. Sanner, Livermore, CA (US); Victoria L. Dias, Livermore, CA (US); John G. Reynolds, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 12/134,700

(22) Filed: Jun. 6, 2008

(65) Prior Publication Data

US 2009/0118120 A1    May 7, 2009

Related U.S. Application Data

(63) Continuation of application No. 10/728,568, filed on Dec. 4, 2003, now Pat. No. 7,393,810, which is a continuation-in-part of application No. 10/285,242, filed on Oct. 30, 2002, now Pat. No. 6,806,227.

(60) Provisional application No. 60/337,361, filed on Nov. 5, 2001.

(51) Int. Cl.
*B01J 23/70* (2006.01)
(52) U.S. Cl. ...................... 502/338; 502/439
(58) Field of Classification Search ................. 502/201, 502/338, 324, 401, 400, 417, 439
See application file for complete search history.

(56) References Cited

U.S. PATENT DOCUMENTS 5,547,794 A * 8/1996 Demizu et al. ............ 430/108.1
5,817,239 A * 10/1998 Tavlarides et al. .......... 210/661
5,948,726 A * 9/1999 Moskovitz et al. .......... 502/415

* cited by examiner

*Primary Examiner*—Edward M Johnson
(74) *Attorney, Agent, or Firm*—John P. Wooldridge

(57) ABSTRACT

Solid materials have been developed to remove arsenic compounds from aqueous media. The arsenic is removed by passing the aqueous phase through the solid materials which can be in molded, granular, or powder form. The solid materials adsorb the arsenic leaving a purified aqueous stream. The materials are aerogels or xerogels and aerogels or xerogels and solid support structure, e.g., granulated activated carbon (GAC), mixtures. The species-specific adsorption occurs through specific chemical modifications of the solids tailored towards arsenic.

5 Claims, 2 Drawing Sheets

SOLID MATERIALS FOR REMOVING ARSENIC AND METHOD THEREOF

This application is a continuation of U.S. patent application Ser. No. 10/728,568 filed Dec. 4, 2003 now U.S. Pat. No. 7,393,810, which is a continuation in part of U.S. patent application Ser. No. 10/285,242, filed Oct. 30, 2002 now U.S. Pat. No. 6,806,227, which claims priority to U.S. Provisional Patent Application Ser. No. 60/337,361, filed Nov. 5, 2001.

The United States Government has rights in this invention pursuant to Contract No. DE-AC52-07NA27344 between the United States Department of Energy and Lawrence Livermore National Security, LLC.

BACKGROUND OF THE INVENTION

Substantial effort has been directed to the removal of contaminants from an aqueous media, such as ground water. Numerous "Superfund" sites have been established because of contamination of ground water by various materials. The main contaminants are metals, particularly uranium and hexavalent chromium, volatile organic compounds (VOCs), high explosive compounds, nitrates, perchlorates, arsenic, and tritium, as well as various commercial and manufacturing waste contaminants. Additionally, naturally occurring arsenic and arsenic from industrial operations has contaminated drinking water sources.

Presently, granular activated carbon (GAC), ion-exchanged resins, air-strippers, and bioremediation are used for contaminate removal. These work on many contaminants. However, there is not a readily available cost-effective remedy for arsenic removal from ground water and surface waters to meet the newly promulgated regulatory requirement for arsenic in drinking water that states a maximum contaminant level of 10 ppb for arsenic. GAC has been commercially used as an adsorbent for contaminants in water. It is cheap and treatment technology hardware is readily available commercially for its use. Even though GAC is a good adsorbent medium for many contaminants, such as VOCs, it is not efficient for certain metals, particularly uranium, hexavalent chromium, and arsenic. Thus, there has been a need for a material by which contaminating metals and certain organic compounds may be removed from aqueous and vapor medias.

SUMMARY OF THE INVENTION

An aspect of the invention includes a method comprising: providing a dried hydrophobic sol-gel on a solid support structure, wherein said dried hydrophobic sol-gel is functionalized with at least one arsenic-removing constituent; and contacting said dried hydrophobic sol-gel on a solid support structure to an aqueous sample.

A further aspect of the invention includes a composition comprising: a predetermined amount of a hydrophobic aerogel functionalized with at least one arsenic-removing constituent; and a predetermined amount of granulated activated carbon, wherein said composition is capable of removing arsenic contaminants from aqueous media.

A further aspect of the invention includes a composition comprising: a mixture consisting essentially of (1) a hydrophobic aerogel functionalized with at least one arsenic-removing constituent and (2) a solid support structure.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
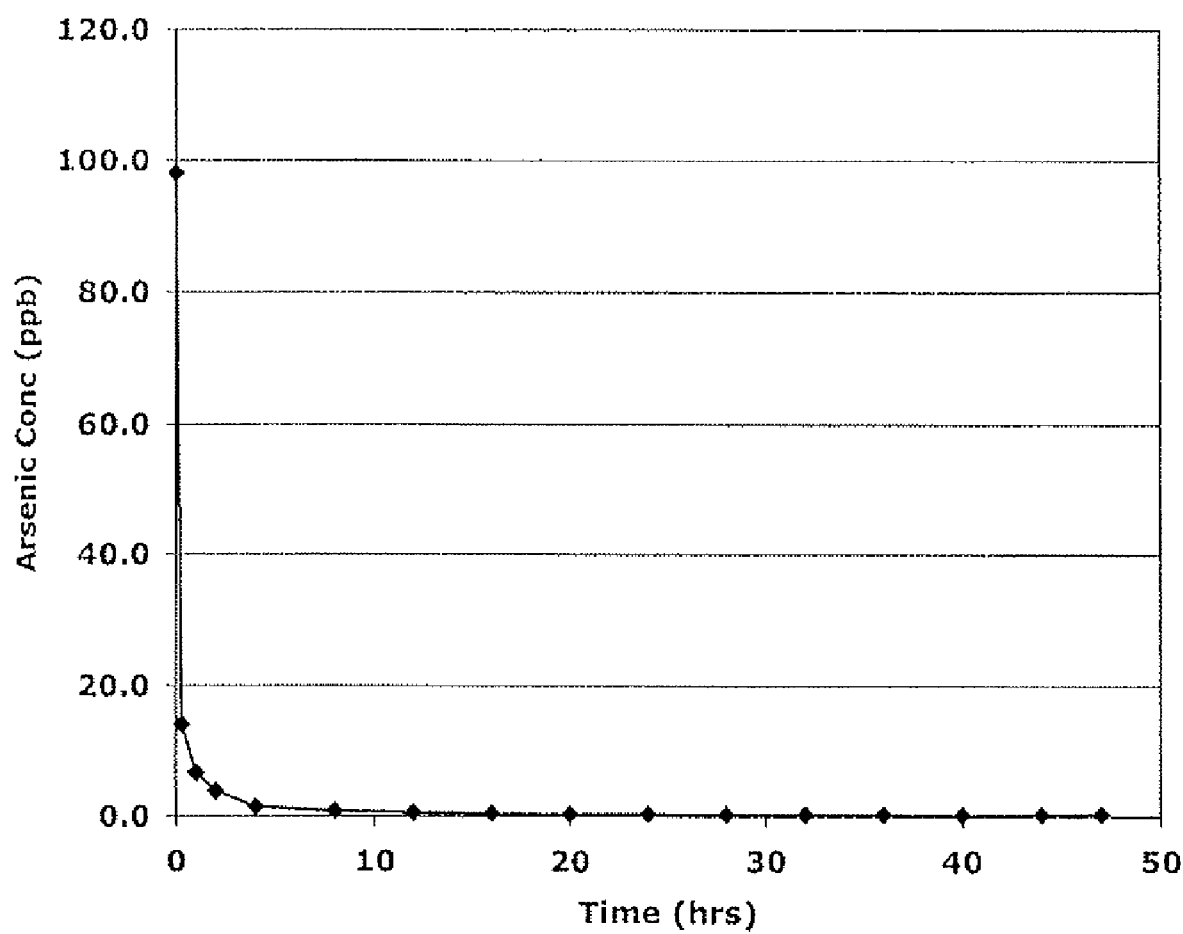
FIG. 1 shows the results of an arsenic adsorption column test using a column loaded with a hydrophobic aerogel/GAC composite functionalized with a manganese and iron mixture.

Disclosed herein is a composition for removing arsenic from aqueous media using a solid material. Also disclosed is the fabrication method thereof. Solid materials are utilized and the arsenic is removed by passing the aqueous phase through the solid materials. The solid materials may be in molded, granular, or powder form. The arsenic is adsorbed by the solid materials leaving a purified aqueous stream. The solid materials are comprised of a dried sol-gel and/or a dried sol-gel and a solid support such as granulated activated carbon (GAC) mixtures. As used herein dried sol-gel is defined as an aerogel or a xerogel. The species-specific adsorption occurs through specific chemical modifications of the solid materials tailored towards the arsenic. The used solid materials can then be disposed of or recycled if the arsenic can be removed from them.

The solid materials can be used to cleanup any aqueous stream. The solid materials disclosed herein may comprise a silica sol-gel that has been modified to be hydrophobic and is activated by drying (either super-critical or evaporation). Further modification is possible if the aerogel or xerogel is mixed with a solid support such as CAC or a solid support structure that has been modified with the same functional groups that provide species-specific binding as in the aerogel or xerogel. This modification is effective to remove contaminants from aqueous streams. The silica aerogel by itself in the past has not been cost-effective for arsenic. However, in the composite with GAC, less than 20% of it is aerogel and the composite is a much better adsorbent for arsenic than any of the aforementioned treatment technologies.

GAC is a widely available commercial material that comes in many forms and from many sources. Acid washed GAC is effective. GAC by itself has been commercially used as an adsorbent for contaminants in water. It is inexpensive and the treatment technology hardware is readily available commercially for its use. It is a good media for adsorption of many contaminants, such as VOCs, but without modification, it is not an efficient adsorbent of arsenic.

Aerogels are nano-structured materials having high surface areas (around 500 $m^2/g$), low densities, and large meso pore structure. These nano-structured properties are configured in a three-dimensional structure giving ideal physical properties for adsorption. Through chemical modification, they can be designed to have species-specific binding, as well as discriminating bulk properties. Combining these properties, with the known adsorption properties of GAC as delineated by Tchobanoglous et al, Water Quality, Characteristics, Modeling and Modification, ISBN: 0-201-05433-7 (1985), hereby incorporated by reference, makes the aerogel/GAC composite ideal for treating environmentally important systems such as ground water.

The superior performance of the aerogel/GAC composite is obtained by being able to tailor the aerogel to be specific for the particular target clean-up stream. This stream can be aqueous with metal ions, aqueous with organic compounds, aqueous with metal ions and organic compounds, or non-aqueous with metal ions, organic compounds, or both. The aerogel/GAC composite design will depend upon all of the components of the stream. Aerogel/GAC composites can be tailored to be hydrophobic.

In one embodiment of an aerogel/GAC composite, the aerogel is tailored to be hydrophobic and specific for adsorbing arsenic. The backbone of the aerogel can be formed by the hydrolysis condensation of tetramethoxysilane, or tetraethoxysilane, i.e., silica sol-gel chemistry. Other commonly used methods found in the literature are also viable. For example, those taught by Brinker and Scherer, Sol-Gel Science, The Physics and Chemistry of Sol-Gel Processing, ISBN: 0-12-134970-5 (1989), which is hereby incorporated by reference. The hydrophobic component can be formed by the addition of a fluorinated substituent. The fluorinated substituent can be added through a co-condensation reaction, for example. The trifluoropropyl group is used only to demonstrate the effect of making the hydrophobic character, not to limit the method of production. Reynolds, Recent Research Developments in Non-Crystalline Solids, ISBN: 81-7895-028-6 (2001), which is hereby incorporated by reference, teaches common methods to make the material hydrophobic but other substituents found in the literature can also be used. The arsenic adsorption site is formed by the incorporation of an arsenic specific binding material into or onto the aerogel and/or the aerogel/GAC composite. Manganese (III) 2,4 pentanedionate and ferric chloride are used to demonstrate the viability of the approach. Other materials that have affinity for arsenic can also be used. Materials that have affinity for other species are preferred in the cases where other metals and/or organics are targets for clean-up or separation. The formation of the aerogel/GAC composite can be made by combining the backbone, hydrophobic component(s), and arsenic binding components with the GAC. Co-gellation followed by supercritical extraction is an example of how the aerogel/GAC composite can be formed.

The following are examples of the solid material (aerogel) formulation of the invention in practice. These examples are not intended to be limiting. Although manganese (III) 2,4 pentanedionate ($Mn(C_5H_7O_2)_3$) and ferric chloride were used in the examples outlined below, iron nitrate, iron oxide, manganese oxide, and manganese acetate could also be used to make aerogel/GAC composites for the removal of arsenic. All samples were tested using a modified ASTM D 3860-98 method (Standard Practice for Determination of Adsorptive Capacity of Activated Carbon by Aqueous Phase Isotherm Technique).

EXAMPLE 1

Four solutions were prepared,

Solution (A) was prepared by dissolving 7.5 g of manganese (III) 2,4 pentanedionate ($Mn(C_5H_7O_2)_3$) and 7.5 g ferric chloride ($FeCl_3$) in 200 g methanol and adding 100 g of GAC. The combined material (solution and solid) was evacuated to remove air from the GAC, then placed in a vacuum oven (pressure of 26 to 28 inches of water) and dried at 150° C. for 16 hours.

Solution (B) was prepared by dissolving 1 g of manganese (III) 2,3 pentanedionate and 1.5 g ferric chloride ($FeCl_3$) in 15 g of methanol.

Solution (C) was prepared by stirring 14.7 g $(CH_3O)_4Si$ and 3.14 g $(CH_3O)_3SiCH_2CH_2CF_3$ with 18 g of methanol.

Solution (D) was prepared by mixing and stirring 10 g water with 21 g methanol and 0.01 g of ammonium hydroxide.

Solution (D) was added to Solution (C) with stirring. Solution (B) was then added to the (D)/(C) mixture and added to 47.2 g of Solution (A) and evacuated to remove any remaining air from the GAC and to allow the sufficient internal and external wetting of the GAC. The evacuated composite material was then placed in a reactor and supercritically dried at 300° C.

6.25 g of the aerogel/GAC composite just described was tested in a column reactor. A 98 ppb arsenic solution at pH 7 was treated in an up-flow configuration. FIG. 1 shows the concentration of arsenic in the effluent as a function of time on stream. The concentration was immediately reduced to 14 ppb and then within a short period of time, it was reduced to 7 ppb or less and remained below this concentration through the entire run.

EXAMPLE 2

Four solutions were prepared:

Solution (A) was prepared by dissolving 5.0 g of manganese (III) 2,4 pentanedionate ($Mn(C_5H_7O_2)_3$) and 5.0 g ferric chloride ($FeCl_3$) in 200 g methanol and adding 100 g of GAC. The combined material (solution and solid) was evacuated to remove air from the GAC, then placed in a vacuum oven (pressure of 26 to 28 inches of water) and dried at 150° C. for 16 hours.

Solution (B) was prepared by dissolving 1 g of manganese (III) 2,3 pentanedionate and 1 g ferric chloride ($FeCl_3$) in 15 g of methanol.

Solution (C) was prepared by stirring 14.7 g $(CH_3O)_4Si$ and 3.14 g $(CH_3O)_3SiCH_2CH_2CF_3$ with 18 g of methanol.

Solution (D) was prepared by mixing and stirring 10 g water with 21 g methanol and 0.01 g of ammonium hydroxide Solution (D) was added to Solution (C) with stirring. Solution (B) was then added to the (D)/(C) mixture and added to 47.2 g of Solution (A) and evacuated to remove any remaining air from the GAC and to allow the sufficient internal and external wetting of the GAC. The evacuated composite material was then placed in a reactor and supercritically dried at 300° C.

Figure 2:
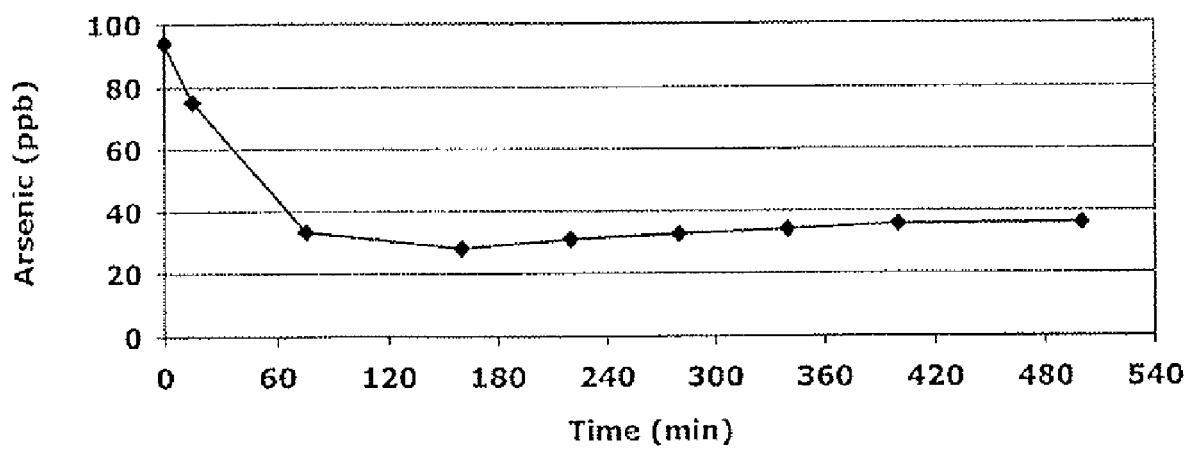
FIG. 2 shows the results of an arsenic adsorption column test using a column loaded with a hydrophobic aerogel/GAC composite functionalized with a manganese and iron mixture.

6.77 g of the aerogel/GAC composite just described was tested in a column reactor. A 94 ppb arsenic solution at pH 7 was treated in an up-flow configuration. FIG. 2 shows the concentration of arsenic in the effluent as a function of time on stream. The concentration was immediately reduced to 75.3 ppb and then within a short period of time, it was reduced to 36.2 ppb or less and remained below this concentration through the entire run.

It has thus been shown that the dried hydrophobic sol-gel (e.g., aerogel) and granulated activated carbon (GAC) mixtures or composites provide a significant increase in adsorption of arsenic over that of GAC or aerogel material alone. Thus, functionalized hydrophobic aerogels enable removal of arsenic. If the arsenic is being removed to decontaminate, the aerogel/GAC compositions enable the removal of arsenic in addition to contaminants that can be adsorbed by CAC alone (e.g., VOCs and trihalomethanes (THMs)), thereby enabling multiple contaminant removal with the same material.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. All numerical values, however, inherently contain certain errors necessarily resulting from the standard deviation found in their respective testing measurements.

While particular examples have been set forth with particular materials, times, etc. to exemplify and teach the principles of the invention, such are not intended to be limiting. Modifications and changes may become apparent to those skilled in the art, and it is intended that the invention be limited only by the scope of the appended claims.

We claim:

1. A composition comprising a dried hydrophobic sol-gel on a solid support structure, wherein said dried hydrophobic sol-gel is functionalized with at least one arsenic-removing constituent comprising a manganese and iron mixture, wherein said iron mixture comprises ferric chloride.

2. The composition recited in claim 1, wherein said mixture is molded, granular or powdered.

3. The composition recited in claim 1, wherein said dried hydrophobic sol-gel is an aerogel or xerogel.

4. The composition recited in claim 1, wherein said solid support structure comprises granulated activated carbon (GAC).

5. The composition recited in claim 4, wherein said GAC has been acid washed.

* * * * *